UNITED STATES PATENT OFFICE.

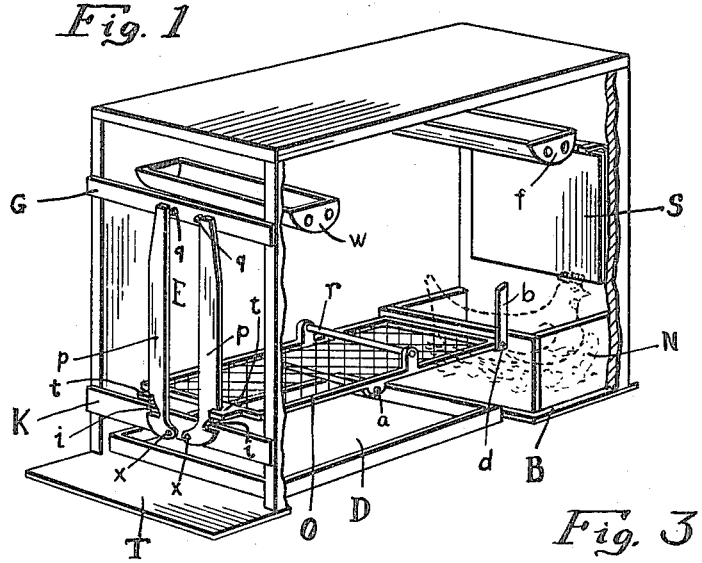
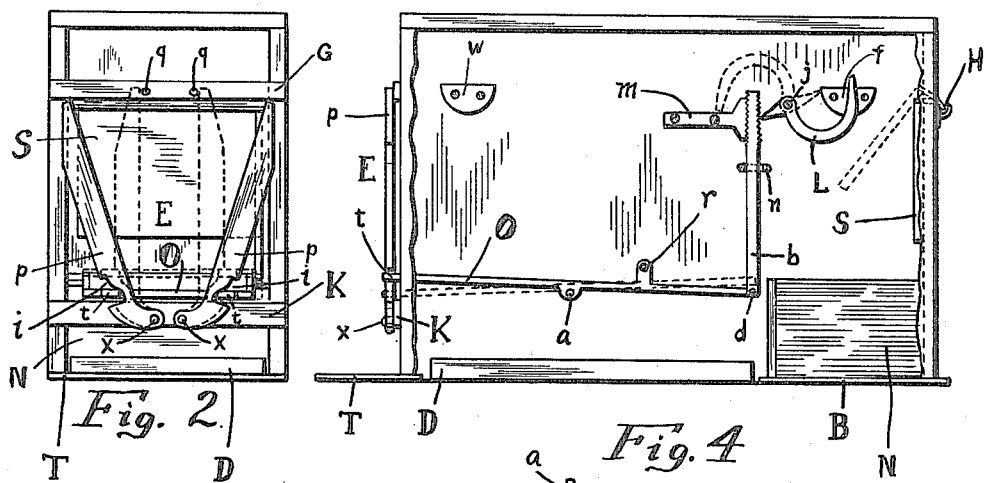
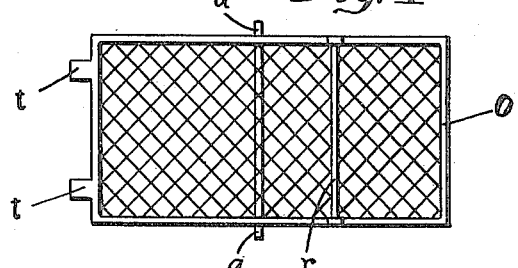

CLARK EDWARDS SHARP, OF COLUMBUS, OHIO.

AUTOMATIC TRAP-NEST COOP.

1,157,595.

Specification of Letters Patent.

Patented Oct. 19, 1915.

Application filed May 21, 1915. Serial No. 29,627.

*To all whom it may concern:*

Be it known that I, CLARK E. SHARP, a citizen of the United States, and a resident of Columbus, in the county of Franklin and State of Ohio, have invented certain new and useful Improvements in Automatic Trap-Nest Coops, of which the following is a specification.

This invention is an improvement in trap-nest coops, seeking to provide means whereby it may be determined which fowl has laid any particular egg; to avoid any annoyance to the fowl while on the nest or feeding or roosting in the coop; to trap or catch a fowl without injury, (for exhibition, examination, or sale to customer or other purpose), in a humane manner, inducing it to enter by means of feed as bait; and the invention consists in certain novel constructions and combinations of parts as will be hereinafter described and claimed.

In the drawings, Figure 1 is a perspective view of the coop, having the automatic locking means broken away and with one side removed to show the interior with a hen on the nest. Fig. 2 is a front view of the coop with the door in open position, and dotted lines show the closed position. Fig. 3 is a side view,—the side wall of coop being broken away to show the parts in place. Fig. 4 is a top view of the oscillating platform, which is the floor of the coop on which the fowl walks to the nest.

By my invention I seek to provide a simple economical construction which will effectually trap a fowl, securing it within the coop to be released by hand, or automatically released by the fowl itself as may be desired; a construction which will provide means for food, water, roost, nest, and housing of said fowl without suffering from crowding, molestation, hunger, or thirst; a construction providing for individual feeding, treatment, and management of fowls, more or less as may be desired by the attendant.

In practice the coop may be made of wood, iron, or other suitable material, without departing from the principles of the invention.

As shown, the coop is box shape with the nest in the rear and lower part, (considering the fowl entrance as the front,) the feed trough $f$ in the rear upper corner, and the water $w$ trough in the front upper corner. It will be noticed that the box formed by the sides and top is open at the bottom and at both ends.

The front end of the box or coop at entrance E is controlled by the door $p$ $p$ Fig. 1, as more fully described hereinafter, and the rear end is closed by a swinging door S hung on hooks H to facilitate gathering eggs or getting the fowl by hand from the coop. The coop rests on two boards, T, B, Fig. 1—board B forming the floor of the nest, and board T forming a stationary platform on which the fowl stands to enter the coop through the entrance E.

A suitable basin D Figs. 1 and 3, for droppings, may be placed below the coop, or the manure may drop to the ground below in case it is desired not to use the basin.

The door, Fig. 2, is composed of two upright pieces or slates $p$ $p$ pivoted at their lower ends at $x$ $x$ to crosspiece K so that they may move in a plane at right angle to the direction of entrance.

The pins or stops $q$ $q$ on crosspiece G, prevent closer positioning of the pieces $p$ $p$ in closed position of the door than that shown in Fig. 1.

The door is actuated by the lugs or projections $t$ $t$ operating in cam notches $i$ $i$ in the pieces $p$ $p$. When the lugs are raised the door closes and remains closed till said lugs are lowered, which operation opens the door because of gravity action since the pivots $x$ $x$ are at no time in vertical alinement with the pieces $p$ $p$.

The lugs or projections $t$. $t$ as shown in Fig. 4 are fastened to and form part of the oscillating platform O which also holds the individual roost $r$. This platform is made of wire or other material sufficiently open to let droppings through, and is pivoted at $a$ Figs. 1 3 4 to the side walls of the coop and forms the floor of the coop proper.

A fowl entering the open door at entrance

E walks on the oscillating platform O toward the nest and its weight on the roost $r$, or roost end of platform O, lowers this end and raises the other end with the lugs $t$ $t$ in the cam notches $i$ $i$, thus actuating the slanting pieces $p$ $p$ to move them from the full line position in Fig. 2 to the dotted line position in the same figure, thus closing the opening. The fowl may now enter the nest, the door remaining closed against other fowls, or it may roost or feed at leisure. Leaving the nest, the fowl's weight near the entrance E, lowers the front end of the oscillating platform O and the lugs $t$ $t$ strike pieces $p$ $p$ at the lower margin of the notches $i$ $i$ when the pivoted platform has again tilted under the influence of the weight of the fowl, thus actuating the upright pieces $p$ $p$ to move at right angles to direction of entrance, back to the slanting open position and the fowl walks out.

It will be noticed that the nest N is several inches lower than the floor formed by the oscillating platform O, therefore, due to fowl nature or instinct, the fowl does not descend to the nest except for laying or nesting purposes, so it is rarely soiled by droppings.

I have above described my invention as automatic only,—the fowl can enter the coop, close the door, turn around, open the same door, walk out. To retain the fowl within the coop, the catch-lever L Fig. 3 is placed in position shown by solid lines. This lever is pivoted to the side wall at $j$ inside the coop. The pawl arm of said lever L, being lighter than the curved arm, presses against upright piece $b$ which is pivotally attached at $d$ to the oscillating platform O and loosely held against the side of the coop by the wire staple $n$. The stationary piece $m$ is fastened to the inside wall of the coop and receives the pressure of piece $b$ when forced against it by catch-lever L should upward force be exerted against piece $b$ by the fowl's weight on the front end of oscillating platform O. The piece $b$ is firmly held against piece $m$ by pawl arm of lever L should any upward resistance be given to piece $b$. Thus, the parts—catch-lever L, upright piece $b$, oscillating platform O, and door $p$ $p$, become immovable, after the entrance E is closed, and the fowl cannot escape, but has free access to feed, water, nest, and roost, within the coop. It may now be caught by hand through rear opening by swinging door S upwardly as indicated by dotted lines Fig. 3 and lifting the fowl out; or, if release only is desired, then turn catch-lever L to the position shown by dotted lines, thus allowing the fowl to open the door at entrance E as before explained.

The edges at the top of piece $b$ are notched or serrated, to receive the knife edge contact of the pawl arm of catch-lever L. Also, piece $m$ is serrated on the side where contact is had with piece $b$.

This invention, described for use with fowl, obviously, may be used with other animals,—hogs, sheep, rabbits, etc., by practically altering the size and adapting the parts to construction without altering the principles involved, for individual feeding, housing, separation, catching, etc., as may be desired.

I claim—

1. A device of the character described comprising a box having an open entrance portion, a pair of vertically disposed slats pivoted at one end and formed with cam formations, the free ends of said slats being movable to open or obstruct said entrance portion, a pivoted bottom for said box, and projections carried by said bottom arranged to coact with said cam formations to actuate said slats when the bottom is moved by the weight of a fowl.

2. A device of the character described comprising a box having an open entrance portion, a pair of vertically disposed slats pivoted at one end and whose opposite ends are movable to open or obstruct said entrance portion, said pivots being offset to be out of vertical alinement with said slats, said slats being formed with cam notches whose bottom edges are disposed substantially at a right angle to the vertical, a pivoted bottom for said box, and forwardly projecting lugs carried by said bottom arranged to coact with said notches to move said slats to either open or closed position by movement of said bottom when moved by the weight of a fowl.

3. A device of the character described comprising a box having an entrance portion, a structure movable to open or close said entrance portion, a pivoted bottom for said box, an operating connection between said structure and said bottom, and a rack and pawl structure operable to prevent tilting of said bottom to actuate said structure.

4. A device of the character described comprising a box having an entrance portion, a structure movable to open or close said entrance portion, a pivoted bottom for said box, an operating connection between said structure and said bottom, an upstanding rack member carried by said bottom, and a pawl movable into a position of engagement with said rack to prevent tilting of said bottom to actuate said structure.

5. A device of the character described comprising a box having an entrance portion, a structure movable to open or close said entrance portion, a pivoted bottom for said box, an operating connection between said structure and said bottom, an upstanding member provided with teeth on opposite faces and pivoted at one end to said bottom, a shoulder element carried by the coop and also provided with teeth to coöperate with the teeth on one side of said upstanding member, and a pawl movable into a position of engagement with the teeth on the other side of said upstanding member to prevent tilting of said bottom to actuate said structure.

CLARK EDWARDS SHARP.

Witnesses:
HARRY KAHN,
ALICE MORAN.

Copies of this patent may be obtained for five cents each, by addressing the " Commissioner of Patents, Washington, D. C."